United States Patent
Pinkerton et al.

(10) Patent No.: US 6,269,662 B1
(45) Date of Patent: Aug. 7, 2001

(54) PNEUMATIC MACHINE CONTROL UNIT FOR AN I.S. MACHINE

(75) Inventors: Steven J. Pinkerton, Avon, CT (US); Jamo Kammonen, Indal (SE); Myles Kneeland Dean, Soraker (SE); Per Sattlin; Arne Stenholm, both of Sundsvall (SE)

(73) Assignee: Emhart Glass S.A., Cham (CH)

( * ) Notice: Subject to any disclaimer, the term of this patent is extended or adjusted under 35 U.S.C. 154(b) by 0 days.

(21) Appl. No.: 09/263,417

(22) Filed: Mar. 5, 1999

(51) Int. Cl.$^7$ .................................................. C03B 9/41
(52) U.S. Cl. ............................................. 65/161; 65/29.11
(58) Field of Search ..................... 65/29.11, 29.15, 65/158, 161

(56) References Cited

U.S. PATENT DOCUMENTS

| 3,634,660 | * | 1/1972 | Moran et al. . |
| 4,247,317 | * | 1/1981 | Wood et al. . |
| 4,369,052 | * | 1/1983 | Hotmer . |
| 4,636,238 | * | 1/1987 | Sidler . |
| 4,705,552 | * | 11/1987 | Liska et al. . |
| 5,580,366 | * | 12/1996 | Farkas et al. . |
| 5,609,659 | * | 3/1997 | Peterson et al. . |

* cited by examiner

Primary Examiner—Sean Vincent
(74) Attorney, Agent, or Firm—Spencer T. Smith

(57) ABSTRACT

A pneumatic machine control unit for an I.S. machine having at least one machine section for processing a gob of molten glass into a selected bottle. The section is supplied by a plurality of pneumatic lines at different pressures. A pneumatic supply input line supplies a manifold which is connected to a plurality of output lines. An electronically settable pressure regulating device is situated in each output line and a control is provided for setting the electronically settable pressure regulating devices either in response to operator inputs or from retrieved pressures from a database.

4 Claims, 2 Drawing Sheets

PNEUMATIC MACHINE CONTROL UNIT FOR AN I.S. MACHINE

The present invention relates to machinery for manufacturing glass containers and more specifically to an I.S. (individual section) machine such as disclosed in U.S. Pat. No. 5,803,945.

BACKGROUND OF THE INVENTION

An I.S. machine is made up of a number (8,10,12, . . .) of identical sections each of which receives a gob of molten glass and forms the gob into a bottle. The bottle is formed in a two step process. The gob is received by a blank mold at a blank station and is formed into a parison. The parison is transferred by an invert/neck ring mechanism to the blow molds at a blow station and is blown into a bottle. Operating air is supplied to each section to operate section mechanisms. "High pressure" and "low pressure" air may be required and where the two step process is the "press and blow" process, a plunger will be advanced into the gob within the blank mold to form the parison with "plunger up air". Bottle making air will also be required. Where the two step process is the "blow and blow" process "settle blow" air is required to settle the molten glass around the plunger. Additionally "final blow", "finish cooling", and "counter blow" air may be required. In addition, air may be required for associated section mechanisms such as the pushout (see U.S. Pat. No. 5,527,372 which uses pressurized air at the pockets ("pocket air"). These pneumatic services are channeled from a main supply into a plurality of manifolds that are located on or about the machine. Each manifold requires a pressure regulating device so that the pressure may be controlled as required for each function.

In state of the art machines, each pressure regulating device is a part of the individual pneumatic service and is located to be convenient to that pneumatic service. As a result the regulating devices are scattered about the machine and each is individually settable by the operator.

OBJECT OF INVENTION

It is an object of the present invention to provide a pneumatic machine control unit that will locate all the pressure regulating devices at a single location and enable all the pressure regulating devices to be automatically set for each job.

Other objects and advantages of the present invention will become apparent from the following portion of this specification and from the accompanying drawings that illustrate in accordance with the mandate of the patent statutes a presently preferred embodiment incorporating the principles of the invention.

BRIEF DESCRIPTION OF THE DRAWINGS

Referring to the drawings.

BRIEF DESCRIPTION OF THE PREFERRED EMBODIMENT

Figure 1:
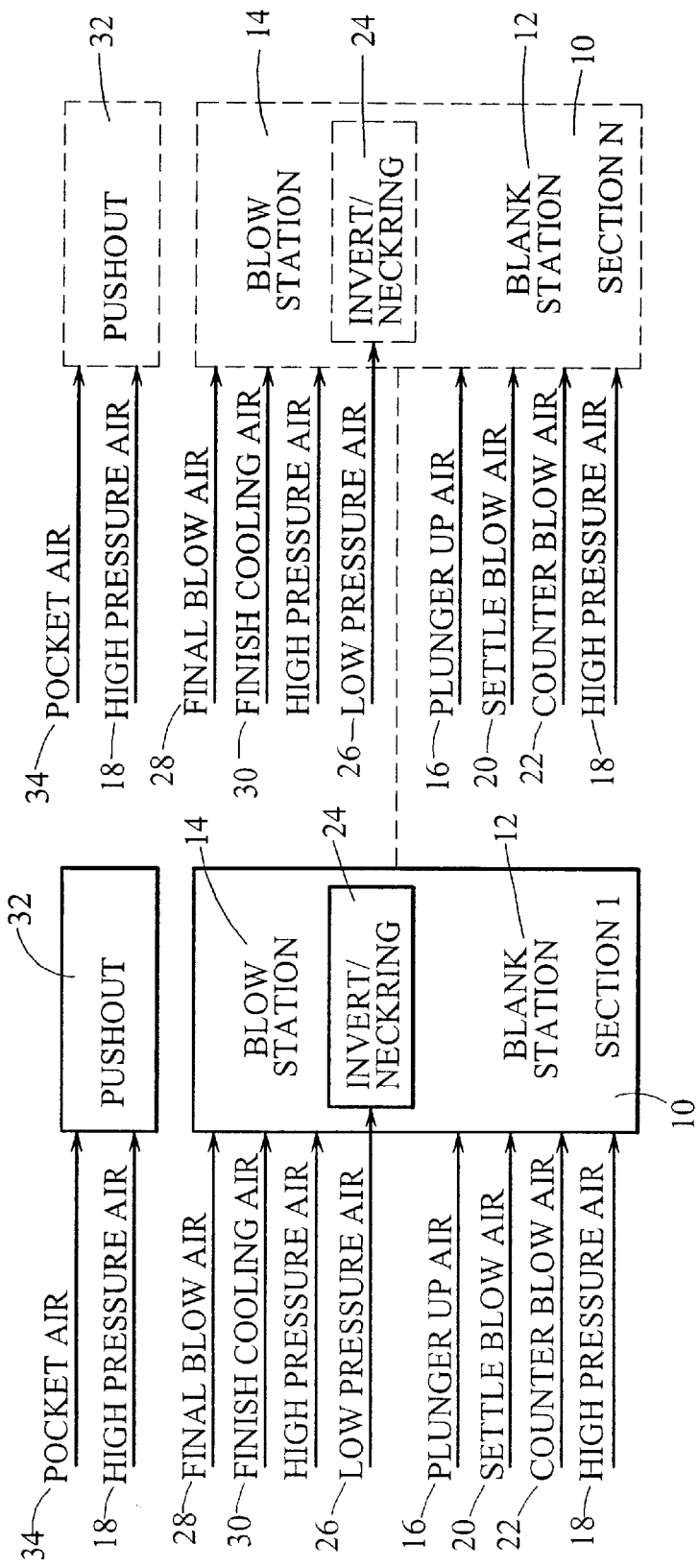
FIG. 1 schematically illustrates a state of the art I.S. machine.

An I.S. machine is made up of a number of identical sections (Section 1, . . . Section N) 10, each of which has a blank station 12. The blank station may form a parison within a blank mold (not shown) in a press cycle with a plunger (not shown) that is moved up to form the parison and than moved down to complete the cycle. Plunger Up Air 16 advances the plunger and High Pressure Air 18 returns the plunger to its start position. The blank station may also form the parison with a blow cycle where Settle Blow Air 20 will first push the molten glass around the blow plunger (not shown) and then Counter Blow Air 22 will form the rest of the parison. The blank mold may be cooled using a valved device which is operated with High Pressure Air 18.

A parison is transferred from the blank station 12 to the blow station 14 with an invert/neck ring mechanism 24 which includes air operated neck ring cylinders (not shown) which are operated by Low Pressure Air 26. The blow station includes a blow mold (not shown) which utilizes Final Blow Air 28 to form the bottle from the parison and Finish Cooling Air 30 to cool the finish. The blow molds may also be cooled using a valved device which is operated with High Pressure Air 18. The formed bottle (not shown) will be transferred to a deadplate (not shown) and then transferred from the deadplate to a conveyor (also not shown) by a pushout 32 which operates with High Pressure air 18 and which can, as shown in U.S. Pat. No. 5,527,372, use Pocket Air 34 to control the bottles.

Figure 2:
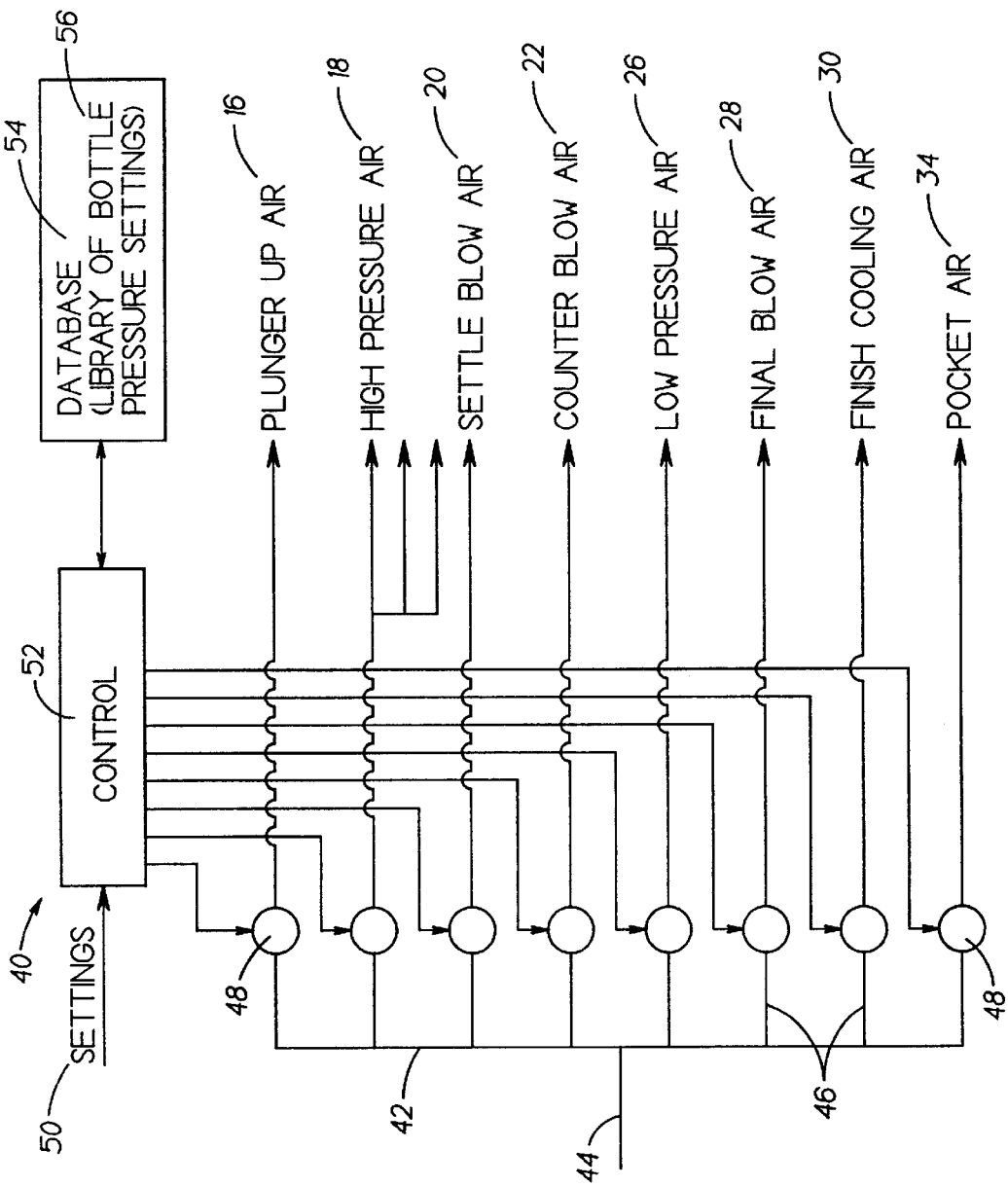
FIG. 2 schematically illustrates a pneumatic machine control unit for the I.S. machine illustrated in FIG. 1 made in accordance with the teachings of the present invention.

A pressure control module 40 (FIG.2) contains a manifold 42 having an input air supply 44 and a plurality of outlets 46. Each outlet 46 has a electronically settable pressure regulating device 48. The outlets 46 are for the above discussed pneumatic functions: Plunger Up Air 16, Counter Blow Air 22, Settle Blow Air 20, Finish Cooling Air 30, Final Blow Air 28, Pocket Air 34, High Pressure Air 18, and Low Pressure Air 26. Each pressure regulating device regulator 48 is connected. A Control 52, sets the desired pressure for each pressure regulating device 48. The individual settings of the regulators for a specific job can be individually set with operator inputs (Settings 50) When the I.S. machine is running producing a specific bottle, the settings for all of the regulators can be retained by the control in a Database 54. Thereafter, whenever the same job is to be performed, the Control can retrieve all of the pressure regulator settings for that job and can automatically set all of the pressure regulators for that job. Over time the data base can include a Library of Bottle Pressure Settings 56.

What is claimed is:

1. A pneumatic machine control unit for an I.S. machine having at least one machine section for processing a gob of molten glass into a selected bottle, the section being supplied by a plurality of pneumatic lines at different pressures said control unit comprising;
   a pneumatic supply input line,
   a manifold connected to said pneumatic supply input line including a plurality of output lines,
   an electronically settable pressure regulating device in each of said output lines, and
   a control for the electronically settable pressure regulating devices including means for setting the pressure of each of the plurality of pressure regulating devices, and
   a database for storing settings for said plurality of pressure regulating devices,
   said control further including means for setting each of said pressure regulating devices with settings stored in said database.

2. A pneumatic machine control unit for an I.S. machine according to claim 1, wherein said plurality of output lines includes plunger up air and high pressure air.

3. A pneumatic machine control unit for an I.S. machine according to claim 1, wherein said plurality of output lines includes settle blow air, counter blow air, low pressure air, and low pressure air.

4. A pneumatic machine control unit for an I.S. machine according to claim 1, wherein said plurality of output lines includes finish cooling air and pocket air.

* * * * *